(12) United States Patent
Generale et al.

(10) Patent No.: US 11,473,444 B2
(45) Date of Patent: Oct. 18, 2022

(54) CERAMIC AIRFOIL WITH COOLING AIR TURN

(71) Applicant: United Technologies Corporation, Farmington, CT (US)

(72) Inventors: Adam P. Generale, Dobbs Ferry, NY (US); Lucas Dvorozniak, Bloomfield, CT (US); San Quach, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 265 days.

(21) Appl. No.: 16/677,760

(22) Filed: Nov. 8, 2019

(65) Prior Publication Data
US 2021/0140341 A1 May 13, 2021

(51) Int. Cl.
*F01D 25/12* (2006.01)
*F01D 9/02* (2006.01)
(Continued)

(52) U.S. Cl.
CPC .............. *F01D 25/12* (2013.01); *F01D 5/187* (2013.01); *F01D 5/188* (2013.01); *F01D 5/284* (2013.01);
(Continued)

(58) Field of Classification Search
CPC .......... F01D 5/186; F01D 5/187; F01D 5/188; F01D 5/189; F01D 9/065; F01D 5/282; F01D 5/284; F01D 11/005; F05D 2240/126; F05D 2260/20; F05D 2260/202; F05D 2250/185; F05D 2230/60; F05D 2240/81; F05D 2300/603; F05D 2300/6033; F05D 2300/6034
See application file for complete search history.

(56) References Cited

U.S. PATENT DOCUMENTS 6,325,593 B1* 12/2001 Darkins, Jr. ............ F01D 5/189
                                                          415/115
8,142,153 B1    3/2012 Liang
(Continued)

FOREIGN PATENT DOCUMENTS

| EP | 0392664 | 10/1990 |
|----|---------|---------|
| EP | 0894946 | 2/1999  |
| EP | 3527783 | 8/2019  |

OTHER PUBLICATIONS

The Extended European Search Report for European Patent Application No. 20205692.5, dated Mar. 18, 2021.

*Primary Examiner* — Christopher Verdier
(74) *Attorney, Agent, or Firm* — Carlson, Gaskey & Olds, P.C.

(57) ABSTRACT

An airfoil includes a ceramic airfoil that defines a leading edge, a trailing edge, a pressure side, a suction side, a first radial end, and a second radial end. The ceramic airfoil section has an internal cavity and a rib that divides the internal cavity into a first radial passage and a second radial passage. The first radial passage is open at both the first radial end and the second radial end, and the second radial passage is open at least at the second radial end. A cooling passage circuit includes a first radial leg through the first radial passage, a second radial leg though the second radial passage, and a turn leg outside of the internal cavity at the second radial end. The turn leg connects the first radial leg and the second radial leg.

20 Claims, 4 Drawing Sheets

(51) Int. Cl.
*F01D 5/28* (2006.01)
*F01D 5/18* (2006.01)
*F01D 9/06* (2006.01)
*F01D 11/00* (2006.01)

(52) U.S. Cl.
CPC .............. *F01D 9/02* (2013.01); *F01D 9/065* (2013.01); *F01D 11/005* (2013.01); *F01D 5/282* (2013.01); *F05B 2240/12* (2013.01); *F05B 2240/801* (2013.01); *F05D 2230/60* (2013.01); *F05D 2300/6033* (2013.01)

(56) References Cited

U.S. PATENT DOCUMENTS

| | | |
|---|---|---|
| 10,267,163 B2 | 4/2019 | Spangler et al. |
| 2016/0312632 A1 | 10/2016 | Hagan et al. |
| 2018/0135445 A1* | 5/2018 | Surace ................. F04D 29/388 |
| 2018/0135450 A1* | 5/2018 | Propheter-Hinckley ..................... F01D 5/187 |
| 2018/0216473 A1* | 8/2018 | Hill ......................... F01D 5/187 |
| 2018/0230814 A1 | 8/2018 | Spangler et al. |
| 2018/0306036 A1 | 10/2018 | Spangler et al. |

\* cited by examiner

CERAMIC AIRFOIL WITH COOLING AIR TURN

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Components in the turbine section are typically formed of a superalloy and may include thermal barrier coatings to extend temperature resistance. Ceramic matrix composite ("CMC") materials are also being considered. Among other attractive properties, CMCs have high temperature resistance and oxidation resistance. Despite these attributes, however, there are unique challenges to implementing CMCs.

SUMMARY

An airfoil according to an example of the present disclosure includes a ceramic airfoil that defines a leading edge, a trailing edge, a pressure side, a suction side, a first radial end, and a second radial end. The ceramic airfoil section has an internal cavity and a rib that divides the internal cavity into a first radial passage and a second radial passage. The first radial passage is open at both the first radial end and the second radial end, and the second radial passage is open at least at the second radial end. A cooling passage circuit has a first radial leg through the first radial passage, a second radial leg though the second radial passage, and a turn leg outside of the internal cavity at the second radial end. The turn leg connects the first radial leg and the second radial leg.

A further embodiment of any of the foregoing embodiments includes an endplate at the first radial end, the endplate including a nozzle, and the cooling passage circuit including an inlet leg through the nozzle and connecting with the first radial leg.

In a further embodiment of any of the foregoing embodiments, the second radial passage is open at the first radial end, and further includes a seal at the first radial end between the rib and the endplate. The seal seals the first radial cavity from the second radial cavity.

In a further embodiment of any of the foregoing embodiments, the second radial passage includes cooling holes through the ceramic airfoil.

In a further embodiment of any of the foregoing embodiments, the airfoil further comprises a flow diverter at the second radial end, and the turn leg is through the flow diverter.

In a further embodiment of any of the foregoing embodiments, the ceramic airfoil includes another rib dividing the internal cavity into a third radial passage. The cooling passage circuit includes a third radial leg though the third radial passage.

In a further embodiment of any of the foregoing embodiments, the turn leg also connects the first radial leg to the third radial leg.

In a further embodiment of any of the foregoing embodiments, the cooling passage circuit includes a second turn leg outside of the internal cavity at the first radial end. The second turn leg connects the second radial leg with the third radial leg. The first radial leg, the second radial leg, and the third radial leg thereby are serially arranged such that the cooling passage circuit is a 3-pass circuit through the ceramic airfoil.

An airfoil according to an example of the present disclosure includes a ceramic airfoil that defines a leading edge, a trailing edge, a pressure side, a suction side, a first radial end, and a second radial end. The ceramic airfoil section has an internal cavity and a rib that divides the internal cavity into a first radial passage and a second radial passage. The first radial passage is open at both the first radial end and the second radial end, and the second radial passage is open at least at the second radial end. A flow diverter is disposed at the second radial end. The flow diverter is configured to receive cooling air flow from the first radial passage and to divert at least a portion of the cooling air flow into the second radial passage.

In a further embodiment of any of the foregoing embodiments, the flow diverter has a turn cavity, and the turn cavity straddles the rib.

A further embodiment of any of the foregoing embodiments includes another rib that divides the internal cavity into a third radial passage. The flow diverter is configured to receive the cooling air flow from the first radial passage and to divert at least a portion of the cooling air flow into the third radial passage.

In a further embodiment of any of the foregoing embodiments, the flow diverter includes a first turn cavity, a second turn cavity, and a splitter between the first turn cavity and the second turn cavity.

In a further embodiment of any of the foregoing embodiments, the first turn cavity and the second turn cavity straddle, respectively, the ribs.

In a further embodiment of any of the foregoing embodiments, the first radial passage is axially between the second radial passage and the third radial passage.

A further embodiment of any of the foregoing embodiments includes another rib that divides the internal cavity into a third radial passage and a second flow diverter disposed at the first radial end. The second flow diverter is configured to receive cooling air flow from the second radial passage and to divert the cooling air flow into the third radial passage.

A method of assembling an airfoil according to an example of the present disclosure includes providing a ceramic airfoil that defines a leading edge, a trailing edge, a pressure side, a suction side, a first radial end, and a second radial end. The ceramic airfoil section has an internal cavity and a rib that divides the internal cavity into a first radial passage and a second radial passage. The first radial passage is open at both the first radial end and the second radial end, and the second radial passage is open at least at the second radial end. A flow diverter is attached at the second radial end. The flow diverter is configured to receive cooling air flow from the first radial passage and to divert at least a portion of the cooling air flow into the second radial passage.

In a further embodiment of any of the foregoing embodiments, the attaching includes securing the flow diverter with a fastener.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
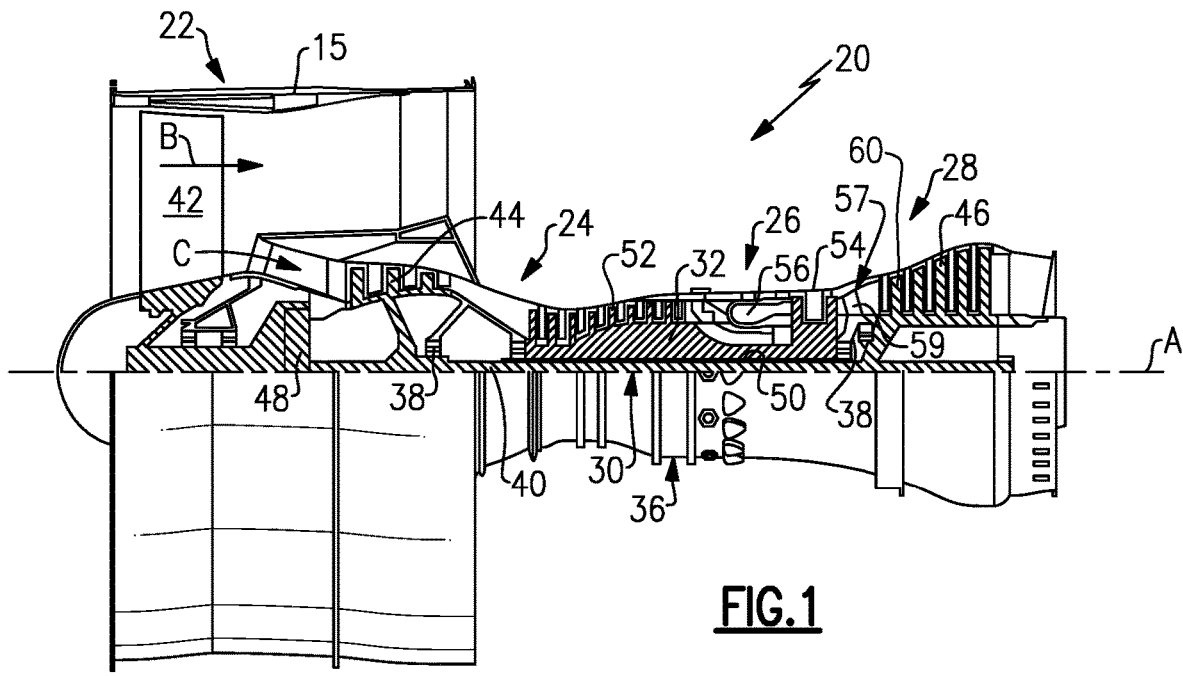
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 meters/second).

Figure 2:
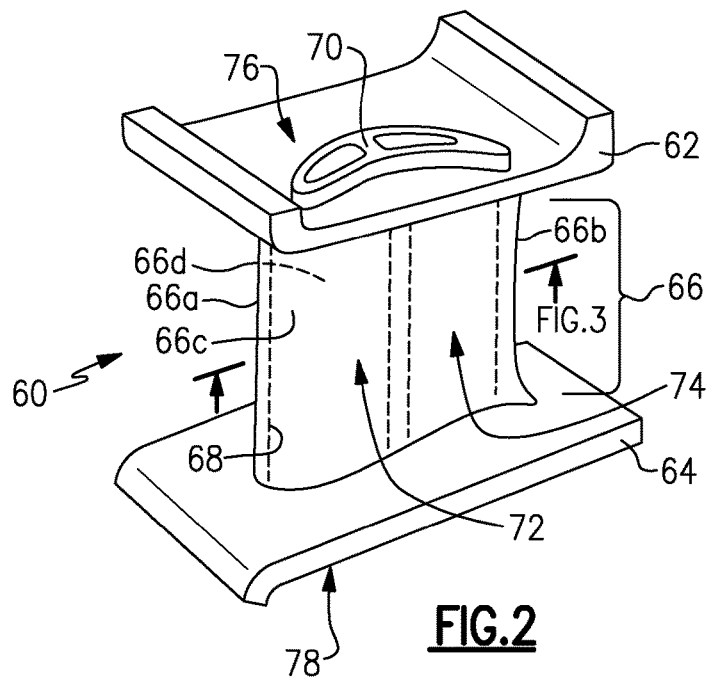
FIG. 2 illustrates an example airfoil of the gas turbine engine.
Figure 3:
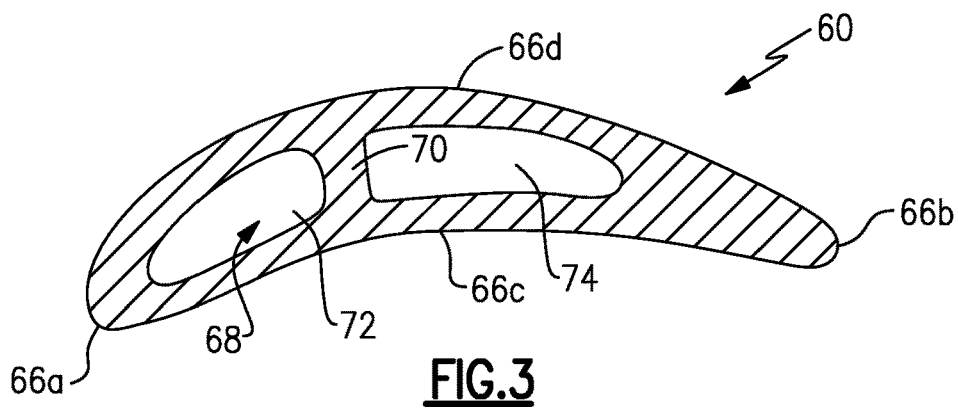
FIG. 3 illustrates a sectioned view of the airfoil of FIG. 2.

FIG. 2 illustrates a schematic view of a representative ceramic airfoil 60 (hereafter "airfoil 60") from the turbine section 28 of the engine 20, and FIG. 3 illustrates a sectioned view of the airfoil 60. In this example, the airfoil 60 is a vane. A plurality of the vanes are situated in a circumferential row about the engine central axis A.

The airfoil 60 in the example shown includes several sections, including first (radially outer) and second (radially inner) platforms 62/64, and a hollow airfoil section 66 that joins the first and second platforms 62/64. The airfoil section 66 circumscribes an internal cavity 68. In the illustrated example, a rib 70 divides the cavity 68 into first and second radial passages 72/74. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The airfoil section 66 defines leading and trailing edges 66a/66b and pressure and suction sides 66c/66d that join the leading and trailing edges 66a/66b. The airfoil 60 further defines first and second radial ends 76/78. In the example shown, the first radial end 76 is a radially outer end, and the second radial end 78 is a radially inner end. The radial passages 72/74 each open at the first radial end 76 and the second radial end 78. An "end" refers to the immediate region in the vicinity of the terminal radial faces of the airfoil 60 to the start of the airfoil section 66. In the example shown, the first radial end 76 is at the first platform 62, and the second radial end 78 is at the second platform 64. It is to be appreciated that in other examples an end may be at an endcap (if the design does not have a platform) or other structure immediately adjacent an airfoil section 66.

At least the airfoil section 66 of the airfoil 60 is formed of a monolithic ceramic or a ceramic matrix composite ("CMC"), although the platforms 62/64 may also be formed of the same monolithic ceramic or CMC. Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to the desired geometry of the airfoil 60. For instance, the fiber plies may be layers or tapes that are laid-up one on top of the other to form the stacked configuration. The fiber plies may be woven or unidirectional, for example. At least a portion of the fiber plies may be continuous through the first platform 62, the airfoil section 66, and the second platform 64. In this regard, the ceramic airfoil 60 may be continuous in that the fiber plies are uninterrupted through the first platform 62, the airfoil section 66, and the second platform 64.

In general, components that are formed of ceramic present thermal management challenges that are unlike metallic components. Metallic alloys have relatively high strength and ductility. Thus, although metallic components are often cooled, the ductility enables the metallic components to withstand high thermal gradients between exterior surfaces in the core gas path and interior surfaces that are cooled. Ceramic materials have relatively higher thermal resistance, but lower thermal conductivity and lower ductility in comparison to metallic materials. As a result, cooling a ceramic airfoil may actually be detrimental to durability if high thermal gradients are produced. In this regard, as will be discussed below, cooling air, such as bleed air from the compressor section 24, is provided through a cooling passage circuit in the airfoil 60 that serves to pre-heat the cooling air before the cooling air is delivered to another portion of the airfoil 60, such as a region where a lower thermal gradient is desired. The pre-heated cooling air provides a cooling effect in that region but enables the region to maintain lower thermal gradients in comparison to non-pre-heated cooling air. The non-limiting examples below demonstrate various configurations for pre-heating the cooling air in one region of the airfoil 60 and delivering the pre-heated cooling air to another region in the airfoil 60.

Figure 4:
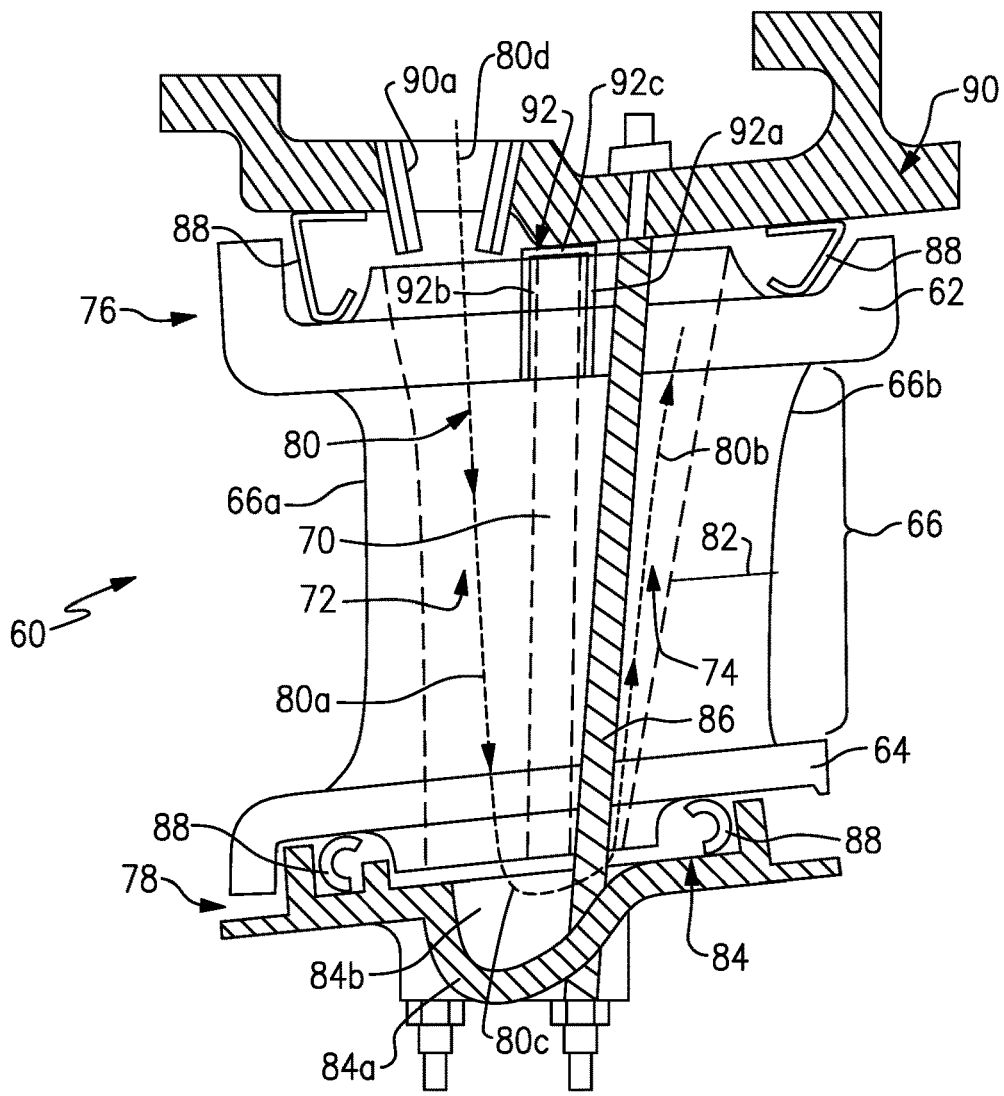
FIG. 4 illustrates a cooling passage circuit in the airfoil.

FIG. 4 illustrates the airfoil 60, with a cooling passage circuit identified at dashed line 80 (hereafter "circuit 80"). The circuit 80 includes several circuit legs, or sections. In this example, a first radial leg 80a extends in the first radial passage 72 of the airfoil section 66, and a second radial leg 80b extends in the second radial passage 74 of the airfoil section 66. The circuit 80 further includes a turn leg 80c that is outside of the internal cavity 68 and that connects the first radial leg 80a and the second radial leg 80b.

Cooling air, such as bleed air from the compressor section 24, is provided into the first radial leg 80a. The cooling air picks up heat in the first radial passage 72 from the walls of the airfoil section 66, thereby substantially increasing the temperature of the cooling air, i.e. pre-heating the cooling air for the second radial leg 80b. The pre-heated cooling air then flows into the turn leg 80c. The turn leg is configured to divert the pre-heated cooling air into the second radial leg 80b through the second radial passage 74. The pre-heated cooling air may pick up additional heat in the turn leg 80c. The pre-heated cooling air flows in the second radial passage 74 to cool the region of the second radial passage 74. A portion of or all of the cooling air may be discharged from the second radial passage 74 into the core gas path C via cooling holes 82 in the pressure and suction sides 66c/66d and/or the trailing edge 66b. Alternatively, a portion of or all of the cooling air may be discharged into the core gas path C though the first platform 62 or to a downstream component.

By first flowing through the first radial leg 80a of the circuit 80 to be pre-heated, the cooling air received into the second radial leg 80b is warmer than it otherwise would have been if received directly from the cooling air source. The relatively warmer pre-heated cooling air maintains at least a portion of the airfoil 60 at a lower thermal gradient. For instance, if cooling air were used in the second radial leg 80b directly from the cooling air source, the internal surfaces of the second radial passage 74 would be cooled to a greater degree, thereby creating relatively larger thermal gradients as discussed above. In particular, such pre-heating may be used for critical load-bearing structural features or regions in the airfoil 60 that are durability-limiting. For instance, the cooling air is pre-heated in a region that is non-load bearing or that at least is not durability-limiting, and then the pre-heated cooling air is used to cool the critical load-bearing feature or region. The pre-heated cooling air cools the critical load-bearing feature or region to a lesser degree than cooling air directly from the cooling air source would, thereby reducing the thermal gradient in the load-bearing feature or region relative to the hotter temperatures near the feature or region from the combustion gases in the core gas path C.

In the example shown, the turn leg 80c is provided by a flow diverter 84. For instance, the flow diverter 84 includes a concavity 84a that defines a turn cavity 84b. In the example shown, the turn cavity 84b straddles the rib 70 such that a portion of the turn cavity 84b is forward of the rib 70 and another portion of the turn cavity 84 is aft of the rib 70. Cooling air flows from the first radial passage 72 into the portion of the turn cavity forward of the rib 70. The curvature of the concavity 84a serves to divert, or turn, the flow of cooling air toward the portion of the turn cavity that is aft of the rib 70. The cooling air then flows into the second radial passage 74. The profile of the curvature of the concavity 84a may be adapted to achieve a smooth diversion of the flow of cooling air, thereby facilitating the lowering of pressure loss.

In the example shown, the flow diverter 84 is in the form of a plate or plate-like structure that is attached at the second radial end 78. For instance, the flow diverter 84 may be formed of a metallic material, such as a nickel- or cobalt-based superalloy. The mechanism of attachment may be varied. In the example shown, the attachment is by a fastener 86 with one or more seals 88 to facilitate containing the cooling air. Here, the fastener 86 is a tie rod and nut. It is to be understood, however, that other types of fasteners, clamps, or the like may additionally or alternatively be used. Additionally, the flow diverter 84 and concavity 84a may integrated into other structures, such as baffles or spars. It is also to be appreciated that although the flow diverter 84 in the illustrated example is at the second radial end (here a radially inner end), the inverse configuration may alternatively be used in which the flow diverter 84 is at the first radial end 76. Moreover, the flow configuration may also be flipped such that the cooling air initially enters the second radial passage 74 and is then diverted into the first radial passage 72.

As also shown in the illustrated example, the airfoil 60 may also include an endplate 90 at the first radial end 76. The endplate 90 includes a nozzle 90a. The circuit 80 includes an inlet leg 80d through the nozzle 90a. The nozzle 90a feeds, or directs, the cooling air into the first radial passage 72. The inlet leg 80d of the circuit 80 is thus connected to the first radial leg 80a of the circuit 80. One or more seals 88 may also be provided between the endplate 90 and the first platform 62 to facilitate containing the cooling air.

Additionally, there may be space between the endplate 90 and the first platform 62. If left open, the space would connect the first and second radial passages 72/74 in the second radial end 76 and bypass the circuit 80. A seal 92 may be provided in the space over the rib 70 to block free flow of cooling air between the first and second radial passages 72/74 at the first radial end 76. For example, the seal 92 includes arms 92a/92b and a bridge portion 92c that joins the arms 92a/92b. The arms 92a/92b may straddle the rib 70 such that the rib 70 supports and retains the seal 92. The bridge 92c projects into the space and abuts the endplate 90 to provide the sealing function.

Figure 5:
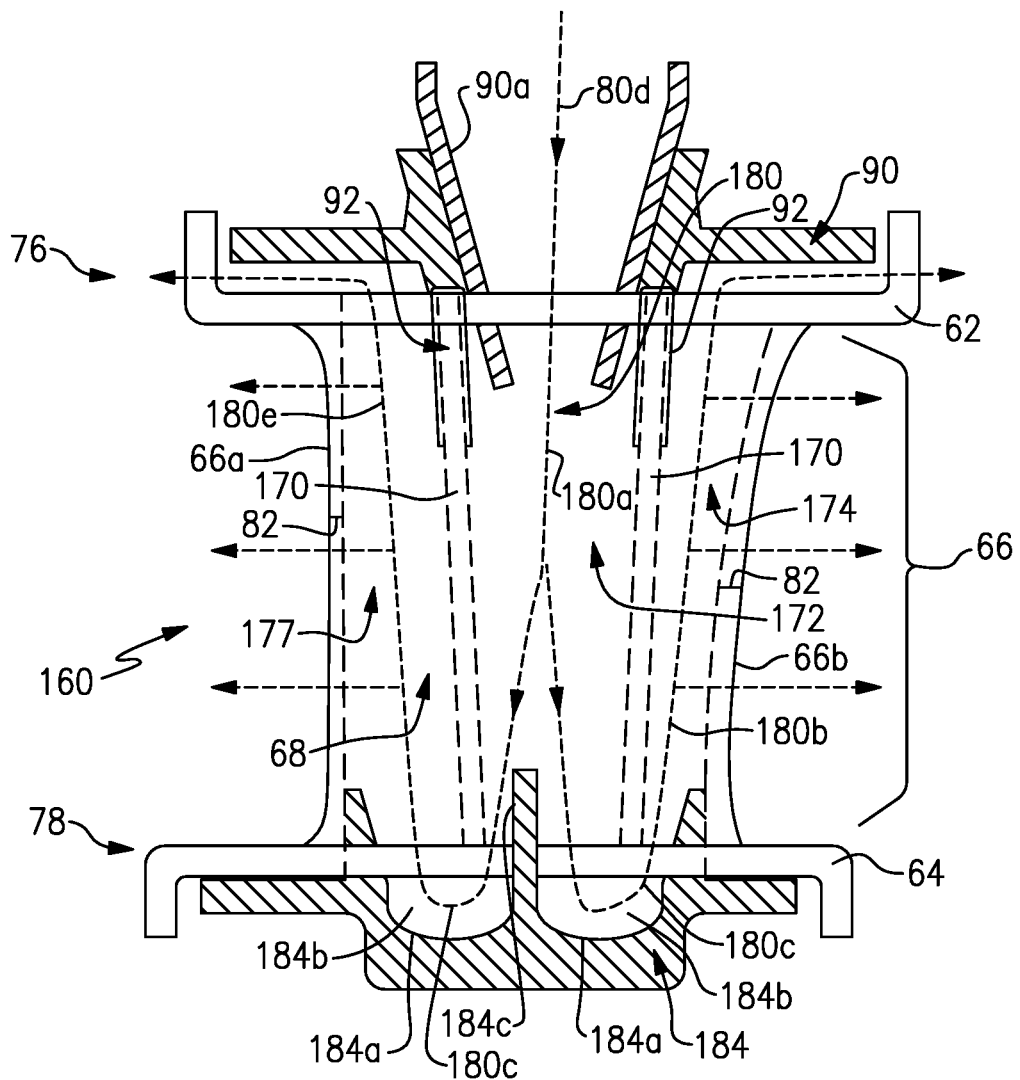
FIG. 5 illustrates another example cooling passage circuit configuration in which the circuit splits.

FIG. 5 illustrates another example airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 includes two ribs 170. In the figure, the rib 170 on the left-hand side is a forward rib and the rib 170 on the right-hand side is an aft rib. The ribs 170 divide the internal cavity 68 into a first radial passage 172, a second radial passage 174, and a third radial passage 177. The second radial passage 174 is a trailing end passage, the third radial passage 177 is a leading end passage, and the first radial passage 172 is an intermediate passage that is axially between the second and third radial passages 174/177.

There is a flow diverter 184 at the second radial end 78. In this example, the flow diverter 184 includes two concavities 184a defining respective turn cavities 184b. Each turn cavity 184b straddles one of the ribs 170. The flow diverter 184 further includes a splitter 184c axially between the concavities 184a. For example, the splitter 184c is a wall and may be tapered in order to smoothly guide flow of the cooling air into the turn cavities 184b. In the example shown, the splitter 184c projects into the first radial passage 172, to split and orient the flow leading into the turn cavities 184b to facilitate reducing pressure losses.

In this example, the cooling passage circuit 180 includes a first radial leg 180a through the first radial passage 172, a second radial leg 180b through the second radial passage 174, a third radial leg 180e through the third radial passage 177, and two turn legs 180c associated with the respective turn cavities 184b.

Cooling air is provided into the first radial leg 180a. The cooling air picks up heat in the first radial passage 172 from the walls of the airfoil section 66, thereby substantially increasing the temperature of the cooling air, i.e. pre-heating the cooling air. The pre-heated cooling air then flows into the turn legs 180c. The splitter 184c divides the flow of the cooling air between the two turn legs 180c. The turn legs 180c divert the pre-heated cooling air, respectively, into the second radial leg 180b through the second radial passage 74 and into the third radial leg 180e though third radial passage 177. The pre-heated cooling air may pick up additional heat in the turn legs 180c. The pre-heated cooling air flows in the second and third radial passages 174/177 to cool the regions of those passages 174/177. A portion of or all of the cooling air may be discharged from the second and third radial passages 174/177 into the core gas path C via cooling holes 82. Alternatively, a portion of or all of the cooling air may be discharged into the core gas path C though the first platform 62 or to a downstream component.

Similar to the example above, by first flowing through the first radial leg 180a of the circuit 180 to be pre-heated, the cooling air received into the second and third radial legs 180b/180e is warmer than it otherwise would have been if received directly from the cooling air source, thereby facilitating lower thermal gradients as discussed above. It is again to be appreciated that an inverse configuration may alternatively be used in which the flow diverters 184 are at the first radial end 76.

Figure 6:
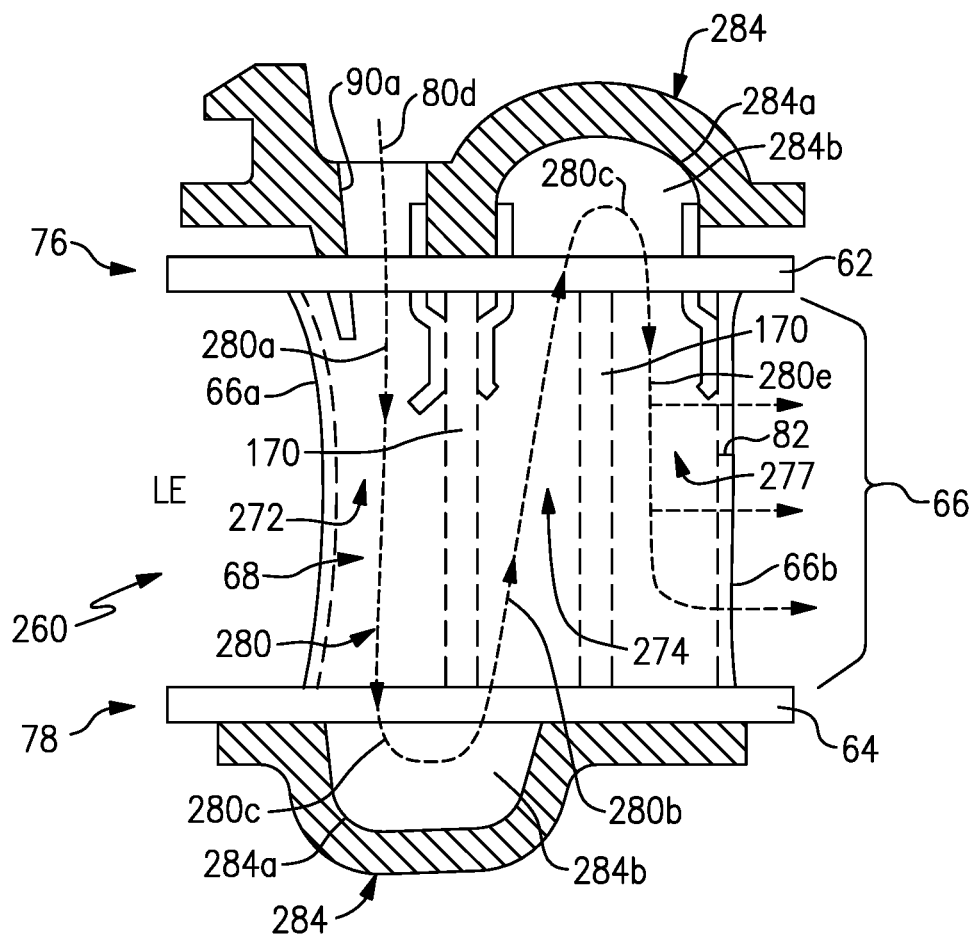
FIG. 6 illustrates another example cooling passage circuit in which the circuit is a 3-pass configuration.

FIG. 6 illustrates another example airfoil 260. In this example, rather than two flow diverters at the second radial end 78, the flow diverters 284 are at each of the first and second radial ends 76/78. Each flow diverter 284 includes a concavity 284a defining respective turn cavities 284b. Each turn cavity 284b straddles one of the ribs 170. The ribs 170 divide the internal cavity 68 into a first radial passage 272, a second radial passage 274, and a third radial passage 277. In this example, the third radial passage 277 is a trailing end passage, the first radial passage 172 is a leading end passage, and the second radial passage 174 is an intermediate passage that is axially between the first and third radial passages 172/177.

In this example, the cooling passage circuit 280 includes a first radial leg 280a through the first radial cavity 272, a second radial leg 280b through the second radial passage 174, a third radial leg 280e through the third radial passage 277, and two turn legs 280c associated with the respective turn cavities 284b. The forward one of the turn legs 280c connects the first and second radial legs 280a/280b, and the aft one of the turn legs 280c connects the second and third radial legs 280b/280e.

Cooling air is provided into the first radial leg 280a. The cooling air picks up heat in the first radial passage 272 from the walls of the airfoil section 66, thereby substantially increasing the temperature of the cooling air, i.e. pre-heating the cooling air. The pre-heated cooling air then flows into the forward turn leg 280c. The turn leg 280c diverts the pre-heated cooling air into the second radial leg 280b through the second radial passage 274, where the cooling air picks up additional heat for pre-heating. The further pre-heated cooling air then flows into the aft turn leg 280c. The aft turn leg 280c diverts the pre-heated cooling air into the third radial leg 280e through the third radial passage 277. The serial arrangement of the legs of the circuit 280 enables the cooling air to flow in three radial passaes through the airfoil 260. The circuit 280 is thus a 3-pass configuration.

Similar to the example above, by first flowing through the first radial leg 280a of the circuit 280 to be pre-heated, the cooling air received into the second and third radial legs 280b/280e is warmer than it otherwise would have been if received directly from the cooling air source, thereby facilitating lower thermal gradients as discussed above. It is again to be appreciated that an inverse configuration may alternatively be used in which the flow diverters 284 are flipped such that the cooling air enters into the first radial passage 172 from the second radial end 78, turns at the first radial end 76 from the first radial passage 172 to the second radial passage 174, and turns at the second radial end 78 from the second radial passage 174 to the third radial passage 277.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    a ceramic airfoil defining a leading edge, a trailing edge, a pressure side, a suction side, a first radial end, and a second radial end radially inward from the first radial end, the ceramic airfoil defined between a first platform and a second platform at the first and second radial ends, respectively, the ceramic airfoil having an internal cavity and a rib dividing the internal cavity into a first radial passage and a second radial passage, the first radial passage being open at both the first radial end and the second radial end, and the second radial passage being open at least at the second radial end;
    a cooling passage circuit including a first radial leg through the first radial passage, a second radial leg though the second radial passage, and a turn leg outside of the internal cavity at the second radial end, the turn leg connecting the first radial leg and the second radial leg; and
    an endplate radially outward from the first platform, the endplate including a nozzle, and the cooling passage circuit including an inlet leg through the nozzle and connecting with the first radial leg.

2. The airfoil as recited in claim 1, wherein the second radial passage is open at the first radial end, and further comprising a seal at the first radial end between the rib and the endplate, the seal sealing the first radial cavity from the second radial cavity.

3. The airfoil as recited in claim 2, wherein the seal includes first and second arms joined by a bridge portion, and wherein the arms straddle the rib such that the rib supports and retains the seal.

4. The airfoil as recited in claim 3, wherein the bridge portion is arranged in a space between the first platform and the endplate and abuts the endplate.

5. The airfoil as recited in claim 1, wherein the second radial passage includes cooling holes through the ceramic airfoil.

6. The airfoil as recited in claim 1, further comprising a flow diverter at the second radial end, and the turn leg is through the flow diverter.

7. The airfoil as recited in claim 1, wherein the ceramic airfoil includes another rib dividing the internal cavity into a third radial passage, the cooling passage circuit including a third radial leg though the third radial passage.

8. The airfoil as recited in claim 7, wherein the turn leg also connects the first radial leg to the third radial leg.

9. The airfoil as recited in claim 7, wherein the cooling passage circuit includes a second turn leg outside of the internal cavity at the first radial end, the second turn leg connecting the second radial leg with the third radial leg, the first radial leg, the second radial leg, and the third radial leg thereby being serially arranged such that the cooling passage circuit is a 3-pass circuit through the ceramic airfoil.

10. The airfoil as recited in claim 7, further comprising one or more seals between the endplate and the first platform.

11. An airfoil comprising:
    a ceramic airfoil defining a leading edge, a trailing edge, a pressure side, a suction side, a first radial end, and a second radial end radially inward from the first radial end, the ceramic airfoil defined between a first platform and a second platform at the first and second radial ends, respectively, the ceramic airfoil having an internal cavity and a rib dividing the internal cavity into a first radial passage and a second radial passage, the first radial passage being open at both the first radial end and the second radial end, and the second radial passage being open at least at the second radial end;
    a flow diverter disposed at the second radial end, the flow diverter being configured to receive cooling air flow from the first radial passage and to divert at least a portion of the cooling air flow into the second radial passage; and
    an endplate radially outward from the first platform, the endplate including a nozzle, the nozzle configured to receive the cooling air flow and communicate a source of cooling air flow to the first radial passage.

12. The airfoil as recited in claim 11, wherein the flow diverter has a turn cavity, and the turn cavity straddles the rib.

13. The airfoil as recited in claim 11, further comprising another rib dividing the internal cavity into a third radial passage, the flow diverter being configured to receive the cooling air flow from the first radial passage and to divert at least a portion of the cooling air flow into the third radial passage.

14. The airfoil as recited in claim 13, wherein the flow diverter includes a first turn cavity, a second turn cavity, and a splitter between the first turn cavity and the second turn cavity.

15. The airfoil as recited in claim 14, wherein the first turn cavity and the second turn cavity straddle, respectively, the ribs.

16. The airfoil as recited in claim 15, wherein the first radial passage is axially between the second radial passage and the third radial passage.

17. The airfoil as recited in claim 11, further comprising another rib dividing the internal cavity into a third radial passage and a second flow diverter disposed at the first radial end, the second flow diverter being configured to receive cooling air flow from the second radial passage and to divert the cooling air flow into the third radial passage.

18. The airfoil as recited in claim 11, wherein the flow diverter is a plate-like structure arranged radially outward from the second platform.

19. A method of assembling an airfoil, the method comprising:

providing a ceramic airfoil that defines a leading edge, a trailing edge, a pressure side, a suction side, a first radial end, and a second radial end radially inward from the first radial end, the ceramic airfoil defined between a first platform and a second platform at the first and second radial ends, respectively, the ceramic airfoil having an internal cavity and a rib that divides the internal cavity into a first radial passage and a second radial passage, the first radial passage is open at both the first radial end and the second radial end, and the second radial passage is open at least at the second radial end;

attaching a flow diverter at the second radial end, the flow diverter being configured to receive cooling air flow from the first radial passage and to divert at least a portion of the cooling air flow into the second radial passage; and providing an endplate radially outward from the first platform, the endplate including a nozzle, the nozzle configured to receive the cooling air flow and communicate a source of cooling air flow to the first radial passage.

20. The method as recited in claim 19, wherein the attaching includes securing the flow diverter with a fastener.

* * * * *